US010108665B2

(12) United States Patent
Konik et al.

(10) Patent No.: US 10,108,665 B2
(45) Date of Patent: *Oct. 23, 2018

(54) GENERATING MULTIPLE QUERY ACCESS PLANS FOR MULTIPLE COMPUTING ENVIRONMENTS

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/734,503

(22) Filed: Jun. 9, 2015

(65) Prior Publication Data

US 2016/0292225 A1    Oct. 6, 2016

Related U.S. Application Data

(63) Continuation of application No. 14/675,799, filed on Apr. 1, 2015.

(51) Int. Cl.
  *G06F 17/30*    (2006.01)
  *G06F 11/20*    (2006.01)
(52) U.S. Cl.
  CPC .. *G06F 17/30463* (2013.01); *G06F 17/30557* (2013.01); *G06F 11/202* (2013.01); *G06F 2201/80* (2013.01)

(58) Field of Classification Search
None
See application file for complete search history.

(56) References Cited

U.S. PATENT DOCUMENTS

| 7,831,569 | B2 | 11/2010 | Bestgen et al. |
| 7,991,763 | B2 | 8/2011 | Bestgen et al. |
| 9,720,967 | B2 * | 8/2017 | Lee ................... G06F 17/30466 |

(Continued)

OTHER PUBLICATIONS

Baranczyk et al., "Forecasting Query Access Plan Obsolescence," U.S. Appl. No. 14/612,520, filed Feb. 3, 2015.

(Continued)

*Primary Examiner* — Richard Bowen
(74) *Attorney, Agent, or Firm* — Nicholas D. Bowman

(57) ABSTRACT

A first database management system (DBMS) running on first computer having a first set of computing resources determines that with respect to the first set of computing resources a first query access plan for executing a query satisfies a set of query optimization criteria. A determination is then made that with respect to a second set of computing resources the first query access plan fails a set of preliminary criteria. In response to this failure determination, a second query access plan for executing the query is generated. Prior to having a second DBMS running on a second computer having the second set of computing resources receive a request to execute the query, a determination is made that with respect to the second set of computing resources the second query access plan satisfies the set query optimization criteria.

11 Claims, 12 Drawing Sheets

(56) References Cited

U.S. PATENT DOCUMENTS

| | | | |
|---|---|---|---|
| 9,727,609 B2* | 8/2017 | Su | G06F 17/30466 |
| 2005/0177557 A1 | 8/2005 | Ziauddin et al. | |
| 2006/0031200 A1 | 2/2006 | Santosuosso | |
| 2006/0136396 A1* | 6/2006 | Brobst | G06F 17/30463 |
| 2007/0282794 A1 | 12/2007 | Barsness et al. | |
| 2008/0052720 A1 | 2/2008 | Barsness et al. | |
| 2008/0133458 A1 | 6/2008 | Zabback et al. | |
| 2008/0270392 A1 | 10/2008 | Day et al. | |
| 2008/0288446 A1 | 11/2008 | Hu et al. | |
| 2009/0100114 A1 | 4/2009 | Bestgen et al. | |
| 2009/0112799 A1 | 4/2009 | Barsness et al. | |
| 2010/0005340 A1 | 1/2010 | Belknap et al. | |
| 2010/0030758 A1* | 2/2010 | Belknap | G06F 17/30463 707/718 |
| 2010/0082599 A1* | 4/2010 | Graefe | G06F 17/30306 707/713 |
| 2010/0235349 A1 | 9/2010 | Kuno et al. | |
| 2010/0306188 A1* | 12/2010 | Cunningham | G06F 17/30463 707/713 |
| 2011/0072008 A1* | 3/2011 | Mandal | G06F 17/30463 707/720 |
| 2012/0084315 A1 | 4/2012 | Schneider et al. | |
| 2012/0191639 A1 | 7/2012 | Katahira et al. | |
| 2013/0151504 A1* | 6/2013 | Konig | G06F 17/30424 707/718 |
| 2013/0166486 A1 | 6/2013 | Kim | |
| 2014/0040235 A1 | 2/2014 | Rajan et al. | |
| 2014/0214880 A1 | 7/2014 | Chi et al. | |
| 2016/0004621 A1* | 1/2016 | Gongloor | G06F 11/3452 707/688 |
| 2016/0203404 A1 | 7/2016 | Cherkasova et al. | |
| 2016/0292167 A1* | 10/2016 | Tran | G06F 17/30463 |
| 2016/0292223 A1* | 10/2016 | Konik | G06F 17/30463 |
| 2016/0292224 A1* | 10/2016 | Konik | G06F 17/30557 |
| 2016/0292226 A1* | 10/2016 | Konik | G06F 17/30557 |
| 2016/0321101 A1 | 11/2016 | Langseth et al. | |

OTHER PUBLICATIONS

Baranczyk et al., "Forecasting Query Access Plan Obsolescence," U.S. Appl. No. 14/675,808, filed Apr. 1, 2015.

Konik et al., "Generating Multiple Query Access Plans for Multiple Computing Environments," U.S. Appl. No. 14/675,803, filed Apr. 1, 2015.

Konik et al., "Generating Multiple Query Access Plans for Multiple Computing Environments," U.S. Appl. No. 14/734,545, filed Jun. 9, 2015.

Konik et al., "Generating Multiple Query Access Plans for Multiple Computing Environments," U.S. Appl. No. 14/675,799, filed Apr. 1, 2015.

Mell et al., "The NIST Definition of Cloud Computing," National Institute of Standards and Technology, U.S. Department of Commerce, Special Publication 800-145, 7 pages, Sep. 2011.

IBM, "List of IBM Patents or Patent Applications Treated as Related", Jun. 5, 2015, 2 pages.

Baranczyk et al., "Forecasting Query Access Plan Obsolescence", U.S. Appl. No. 15/899,827, filed Feb. 20, 2018.

IBM, List of IBM Patents or Patent Applications Treated as Related, Feb. 20, 2018, 2 pages.

* cited by examiner

GENERATING MULTIPLE QUERY ACCESS PLANS FOR MULTIPLE COMPUTING ENVIRONMENTS

BACKGROUND

The present disclosure relates to database query processing and, more specifically, to generating new query access plans to account for changes in computing resource availability.

Databases are well known systems for storing, searching, and retrieving information stored in a computer. One type of database used today is the relational database, which stores data using a set of tables that may be reorganized and accessed in a number of different ways. Relational databases are able to represent relationships between fields within separate tables, facilitating the retrieval of relevant information. Users may access information in relational databases using a relational database management system (DBMS).

Each table in a relational database may include a set of one or more columns with each column typically specifying a name and a data type. A query of a relational database may specify which columns to retrieve data from, how to join the columns together and conditions that must be satisfied for a particular data item to be included in a query result table. Current relational databases may require queries be composed in query languages. A widely used query language is Structured Query Language (SQL). However, other query languages are also used.

Once composed, a query is executed by the DBMS. Typically, the DBMS interprets the query to determine a set of steps that must be carried out to execute the query. These steps are together referred to as a query access plan (e.g., query execution plan). Statistics may be kept pertaining to data stored in a database. Such statistics provide data for building the query access plan. The DBMS may include a query optimizer (such as an SQL optimizer) which may select the query access plan that is likely to be the most efficient. When generated, a query access plan may contain the information necessary to retrieve rows for a query. This may include such details as the tables, indexes, parallelisms, join orders, and temporary tables, as well as the operations (e.g., transforms, sorting, grouping) to perform on each value in a column or row.

SUMMARY

According to embodiments of the present disclosure, aspects of the disclosure may include a method. As part of the method, an optimizer of a first database management system (DBMS) running on a first computer system having a first set of computing resources determines that with respect to the first set of computing resources a first query access plan configured for executing a query satisfies a set of query optimization criteria. A determination is made that with respect to a second set of computing resources the first query access plan fails a set of preliminary criteria. In response to this failure determination, a second query access plan configured for executing the query is generated. Prior to having a second DBMS running on a second computer having the second set of computing resources receive a first request to execute the query, a determination is made that with respect to the second set of computing resources the second query access plan satisfies the set of query optimization criteria.

According to embodiments of the present disclosure, aspects of the disclosure may also include a computer program product. The computer program product includes program instructions embodied on a computer readable medium. The program instructions are executable by at least one computer to cause the at least one computer to perform a method. As part of this method performed by the at least one computer, an optimizer of a first database management system (DBMS) running on a first computer system having a first set of computing resources determines that with respect to the first set of computing resources a first query access plan configured for executing a query satisfies a set of query optimization criteria. A determination is made that with respect to a second set of computing resources the first query access plan fails a set of preliminary criteria. In response to this failure determination, a second query access plan configured for executing the query is generated. Prior to having a second DBMS running on a second computer having the second set of computing resources receive a first request to execute the query, a determination is made that with respect to the second set of computing resources the second query access plan satisfies the set of query optimization criteria.

According to embodiments of the present disclosure, aspects of the disclosure may also include a system. The system comprises a first computer. The first computer has a first set of computing resources that include a first at least one memory and a first at least one processor in communication with the first at least one memory. A first database management system (DBMS) runs on the first computer. This first DBMS is configured to receive a request to execute a query, to determine that with respect to the first set of computing resources a first query access plan configured for executing the query satisfies a set of query optimization criteria, and to obtain a first result set for the query by implementing the first query access plan. The system further comprises a second computer. The second computer has a second set of computing resources that includes a second at least one memory and a second at least one processor in communication with the second at least one memory. A second DBMS runs on the second computer. This second DBMS is configured to determine that with respect to the second set of computing resources the first query access plan fails a set of preliminary criteria and to generate, in response to this failure determination, a second query access plan configured for executing the query. Prior to its receiving a second request to execute the query, the second DBMS is further configured to determine that with respect to the second set of computing resources the second query access plan satisfies the set of query optimization criteria. In response to this second query access plan satisfaction determination, the backup DBMS is further configured to store the second query access plan.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
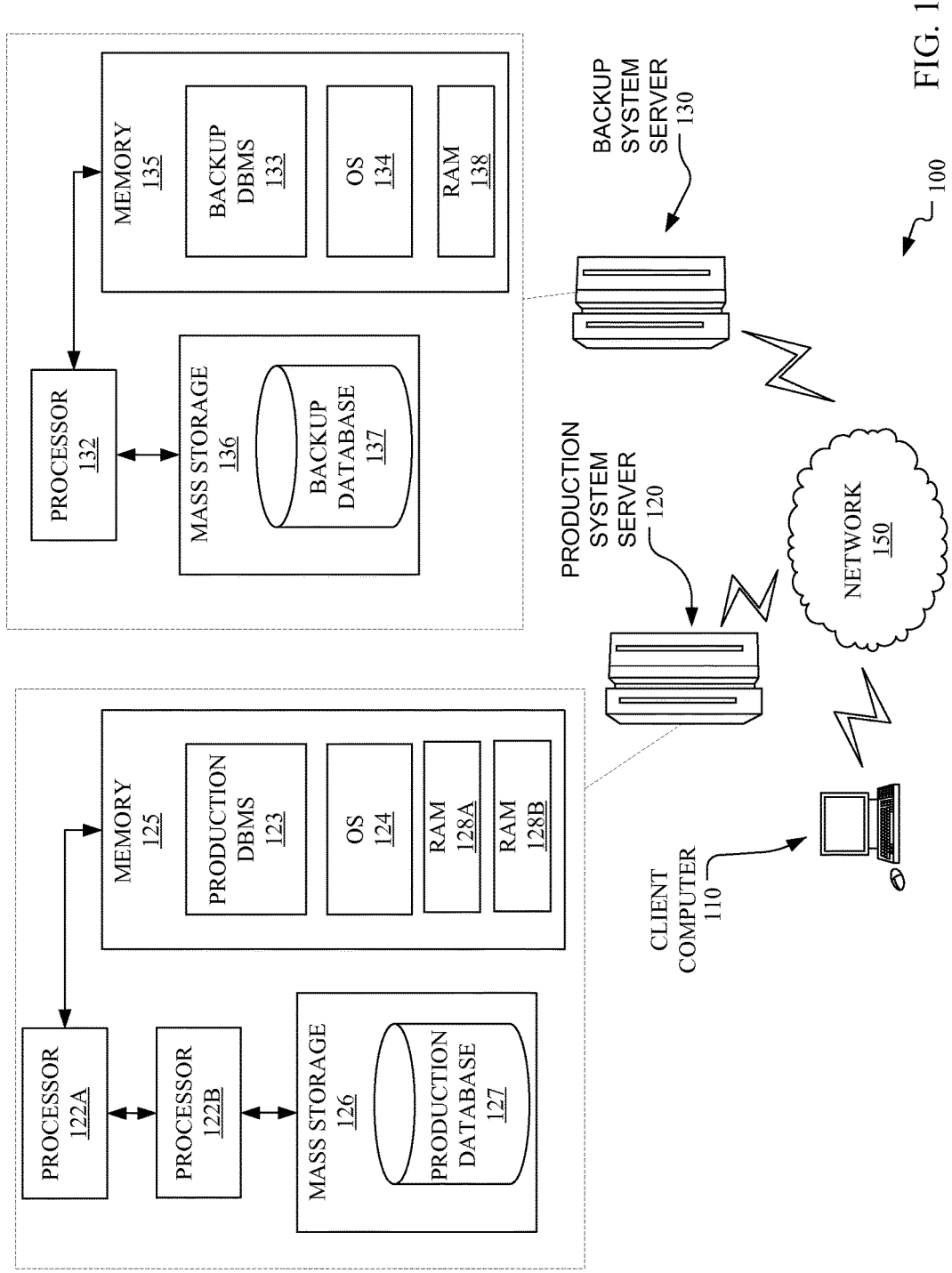
FIG. 1 illustrates a block diagram of an example distributed computing environment incorporating a production system server and backup system server for managing a user's data, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database query processing and, more specifically, to generating new query access plans to account for changes in computing resource availability. While the present disclosure is not necessarily limited to such applications, various aspects of the disclosure may be appreciated through a discussion of various examples using this context.

For most queries there are many different ways that they can be processed. Each different way is a different query access plan that will typically have a different processing time. As a result, a database management system (DBMS) executing the same query using the same set of computing resources (e.g., same CPU, same memory) and on the same database may have drastically different processing times depending on the specific query access plan utilized. The goal of query optimization is to find an optimal query access plan (e.g., one with the shortest processing time for executing a specific query using a specific set of computing resources and on a specific database). While this is the goal, obtaining the best possible query access plan may be impractical and an approximation of the optimum may be discovered by comparing several different alternative query access plans or by using other sets of query optimization criteria.

The time required to generate a desired query access plan may also vary significantly and may depend on how much materialization and polling of statistics is required for that query access plan. Once built, a query access plan may be reused several times for the same query and may be saved for such reuse (for example, in a plan cache).

Statistics are the information used by the optimizer to evaluate query access plans. As used herein, statistics may refer to metadata about the database on which the query is intended to be executed. In some embodiments, statistics may include data objects that contain statistical information about values (or value distributions) in one or more columns or tables in the database. These statistics may be used, for example, by the optimizer to estimate the cardinality (e.g., number of rows) that will be in a query result set. Based on this cardinality estimate, the optimizer may be able to generate a high-quality query access plan for the situation. For example, a cardinality estimate could be used to help an optimizer select a first query access plan that has an index seek operator rather than a second query access plan that has an index scan operator, because the first operator is more efficient under the circumstances.

Whether or not a specific query access plan is optimal or cost effective may change depending on the computing resources available to the DBMS executing the query. In some situations, once a specific query access plan is developed for a specific query, the DBMS may continue to use that same query access plan every time the query is executed. Then, when the set of available computing resources changes such that the query access plan is no longer cost-effective (for example, when there is a switch to a smaller backup system with fewer computing resources), another query access plan is generated and is used from then forward for executions of the query. This method may have some problems, however. Specifically, by waiting until a query access plan is no longer cost effective to begin generating and evaluating a new query access plan, certain inefficiencies and query execution delays may result. For example, consider a situation where a first query access plan is run daily. This may continue without issue for several days, then one day, prior to executing the first query access plan, the production system goes down and the user is forced to switch to a backup system to run the query. The optimizer of a DBMS running on the backup system determines that because of this change in computing resources, the first query access plan is no longer the most cost effective query access plan. At this time the DBMS may be left with two unacceptable alternatives, either to implement the now suboptimal first query access plan immediately, or delay execution of the query while another more cost-effective query access plan is generated.

In some embodiments of the present disclosure, when a query is received from a user by a DBMS running on a first set of computing resources, a first query access plan may be generated for executing the query using that first set of computing resources. This first query access plan may then be implemented using the first set of computing resources and a result set may be returned to the user. Then, prior to switching to using a second set of computing resources (either by the same DBMS or by another DBMS running on a backup system) to perform query executions, the first query access plan may be compared to a set of preliminary criteria. If the first query access plan fails the set of preliminary criteria, then a new query access plan may be generated for executing the query using the second set of computing resources. This second query access plan may then be stored until after the switch occurs.

In some embodiments, the DBMS running on the first set of computing resources may be a production DBMS running on a production system, while the DBMS running on the second set of computing resources may be backup DBMS running on a backup system. This arrangement may be utilized, for example, in situations where an entity employs a high availability backup strategy, wherein its production system is replicated to another system which is relegated as a backup system. In some embodiments, the entity may switch to the backup system (effectively making it the new production system) at times when the production system is shutdown, for example, after a catastrophic event or where maintenance or upgrades are required. In some situations, the goal may be for the switch to be a live switchover that appears seamless to users that execute queries in the environment.

In some embodiments, a DBMS may run on a scalable production system. This DBMS may have at least two operating modes that include a first operating mode, wherein the scalable production system runs on a first set of computing resources, and second operating mode, wherein the scalable production system runs on a second set of computing resources. In such embodiments, a DBMS running on the first set of computing resources as described herein may actually be the DBMS in the first operating mode. Likewise, a DBMS running on the second set of computing resources as described herein may be the DBMS in the second operating mode.

Referring now to FIG. 1, shown is a block diagram of an example distributed computing environment 100 incorporating a production system server and backup system server for managing a user's data, in accordance with embodiments of the present disclosure. As shown, distributed computing environment 100 includes a client computer 110, a production system server 120, and a backup system server 130, all in communication with each other over a network 150. In some embodiments, the network 150 may be implemented by any number of any suitable communications media (e.g., wide area network (WAN), local area network (LAN), Internet, intranet, etc.). Alternatively, the computers of network 150 may be local to each other, and communicate via any appropriate local communication medium (e.g., local area network (LAN), hardwire, wireless link, intranet, etc.). In some embodiments, the network 150 may be implemented within a cloud computing environment, or using one or more cloud computing services. As described herein, a cloud computing environment may include a network-based, distributed data processing system that provides one or more cloud computing services.

In some embodiments, the production system server 120 may act as the primary system for the storage and management of a user's data. As shown, the hardware and software elements of production system server 120 includes processors 122A, 122B in communication with mass storage 126 and memory 125. Processors 122A, 122B may each include one or more central processing units (CPUs) and memory 125 may incorporate any type of memory. As shown, the memory 125 includes an operating system (OS) 124, a production DBMS 123 and random access memory (RAM) 128A, 128B. The mass storage 126, which may include, for example, one or more hard disk drives, houses the production database 127, including a primary copy of the user's data.

In some embodiments, the backup system server 130 may act as the backup system for the storage and management of the user's data. In some embodiments, the backup system server 130 may be a high-availability backup. Further, in some embodiments, the backup system server 130 may be similar to the production system server 120. For example, as shown, the hardware and software elements of backup system server 130 includes processor 132 in communication with mass storage 136 and memory 135. Processor 132 may include one or more central processing units (CPU's) and memory 135 may incorporate any type of memory. As shown, the memory 135 includes an OS 134, a backup DBMS 133 and random access memory (RAM) 138. The mass storage 136, which may include, for example, one or more hard disk drives, houses the backup database 137, including a secondary copy of some or all of the user's data.

In some embodiments, there may be some differences between a production system server 120 and a backup system server 130. Specifically, in some embodiments, there may be significant differences between the set of computing resources available within each of the systems 120, 130. For example, as shown, the production system server 120 has twice as many processors and twice as much RAM as backup system server 130. Also, the amount and form of the user's data stored in backup database 137 may not be an exact duplicate of the user's data stored in production database 127. These differences in data may have a variety of causes. For example, the backup database 137 might not include some of the newest data included in production database 127 if the newest data was added to the production database since the last time the backup database was updated. For another example, the backup database 137 might include data from a longer period of time than the production database 127 (e.g., the last year of data in one and only the last month of data in the other).

In use, a user acting via the client computer 110 may send instructions or requests (e.g., SQL queries) to the production system server 120 via the network 150. The requests are responded to by the production DBMS 123, which runs on the operating system 124. Specifically, the DBMS 123 uses information obtained from the production database 127 to generate responses (e.g., in the form of result sets) to the requests sent from the client computer 110. During times when the production system server 120 is down or otherwise unavailable, a switch may occur from the production system server 120 to backup system server 130. After the switch, requests sent from the client computer 110 may be transmitted to the backup system server 130 via the network 150. These requests are responded to by the backup DBMS 133, which uses information obtained from the backup database 137 to generate its responses.

While distributed computing environment 100 is depicted as including a personal computer (110) and two servers (120, 130), it is contemplated that, in some embodiments, computers 110, 120, and 130 may be any relevant computer systems or combination or portion of computer systems including, for example, servers, desktops, laptops, mobile phones, smart phones, tablets, and the like. Further, the three computers of FIG. 1 are shown for illustrative purposes only; it is contemplated that any number of computers may be used in some embodiments.

Figure 2:
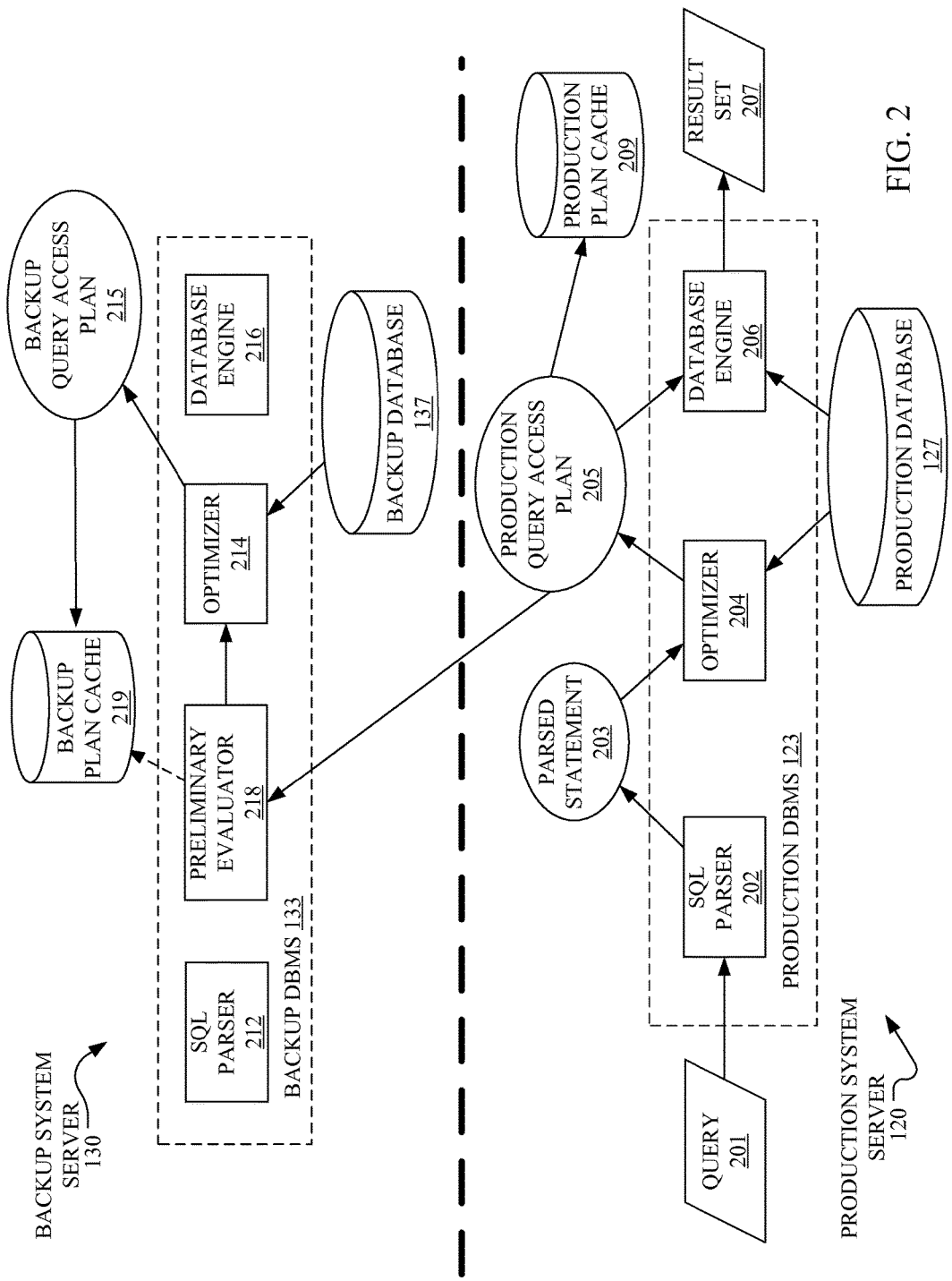
FIG. 2 illustrates a block diagram of an example use of the production system server and backup system server shown in FIG. 1 to generate production and backup query access plans for executing a query, in accordance with embodiments of the present disclosure.

Referring now to FIG. 2, shown is a block diagram of an example use of the production system server 120 and backup system server 130 shown in FIG. 1 to generate production and backup query access plans 205, 215 for executing a query 201, in accordance with embodiments of the present disclosure. As shown, the production DBMS 123 of the production system server 120 may include a SQL parser 202, an optimizer 204, and a database engine 206. In this example, a query 201 generated by a user is received by the SQL parser 202. In some embodiments, the query 201 may be provided in the form of an SQL statement. SQL parser 202 then generates a parsed statement 203 therefrom, which is passed to optimizer 204 for query optimization. As a result of query optimization, a production query access plan 205 is generated. As shown, the optimizer 204 uses statistics obtained from the production database 127 in order to create the production query access plan 205. Once generated, a copy of the production query access plan 205 is stored in a production plan cache 209. The production query access plan 205 is also forwarded to database engine 206 for execution of the query 201 (through implementation of the production query access plan 205) on the production database 127. The result of the execution of the query 201 is a result set 207 (e.g., an organized version of the information requested in the query), which may be transmitted to the user that submitted the query 201 or stored for later transmission to the user.

In addition to being implemented and stored on the production system server 120, the production query access plan 205 may also be transmitted to the backup system server 130. As shown, the backup DBMS 133 of the backup system server 130 may include a SQL parser 212, an optimizer 214, a database engine 216, and a preliminary evaluator 218. To continue this example, the production query access plan 205 is received by the preliminary evaluator 218. The preliminary evaluator then evaluates, based on a set of preliminary criteria, whether the production query access plan 205 is likely to be acceptable for use in executing the query 201 on the backup DBMS 133. In some embodiments, this evaluation may effectively be a determination as to whether the set of computing resources available on the production system server 120 are different enough from the set of computing resources available on the backup system server 130 to render the production query access plan 205 unacceptable for use by the backup DBMS 133. Likewise, differences between the production database 127 and the backup database 137 may also be a factor in this evaluation by the preliminary evaluator 218. Also, differences between the production DBMS 123 and the backup DBMS 133 (e.g., where they are different versions of the same program) may be yet another factor in this evaluation. If the preliminary evaluator determines that the production query access plan 205 is acceptable, then it is stored in the backup plan cache 219. If the production query access plan 205 is unacceptable, then it (and/or parsed statement 203) is passed to the optimizer 214 for new query optimization. As a result of this query optimization, a backup query access plan 215 is generated. As shown, the optimizer 214 uses statistics obtained from the backup database 137 in order to create the backup query access plan 215. Once generated, a copy of the backup query access plan 215 is stored in the backup plan cache 219 for later implementation (e.g., when the backup system server 130 is put into active use).

Figure 3:
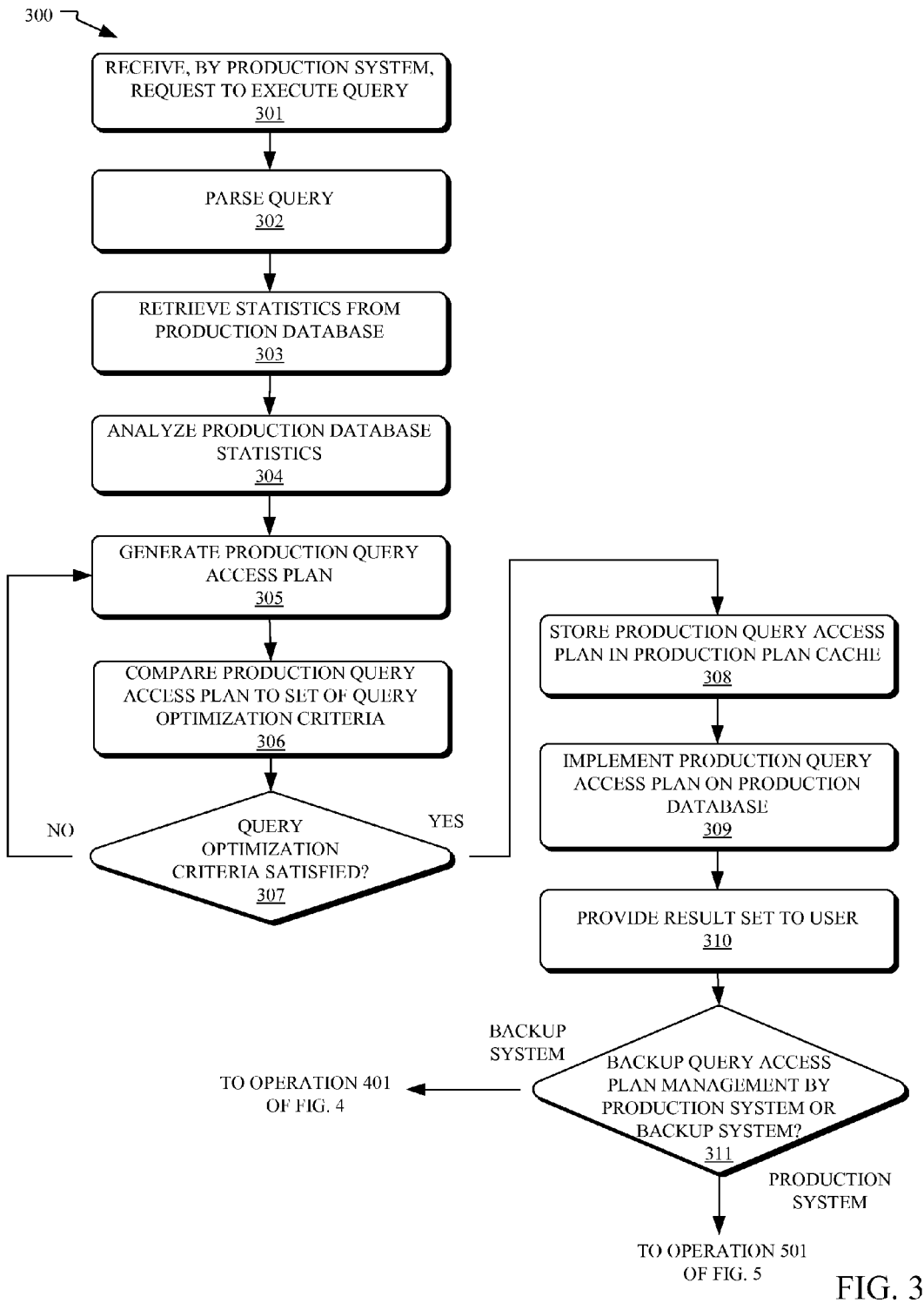
FIG. 3 illustrates a flowchart of an example method for using a production system for providing a result set to a user in response to a query, in accordance with embodiments of the present disclosure.

Referring now to FIG. 3, shown is a flowchart of an example method 300 for using a production system for providing a result set to a user in response to a query, in accordance with embodiments of the present disclosure. In some embodiments, one or more operations of method 300 may be carried out by elements of production DBMS 123 of FIG. 1, such as SQL parser 202, optimizer 204, and database engine 206 of FIG. 2. The method 300 may begin at operation 301, wherein a request to execute a query is received by the production system. Per operation 302, the query is parsed. Per operation 303, statistics are retrieved from a production database (such as production database 127 of FIG. 1) and, per operation 304, the production database statistics are analyzed. Based on the analysis, per operation 305, a production query access plan (e.g., a query access plan intended and/or configured for implementation by the production system) is generated for the query.

Per operation 306, the production query access plan is compared to a set of query optimization criteria. As used herein, a variety of factors may be used in formulating the set of query optimization criteria used to evaluate a query access plan. In some embodiments, a query access plan may be deemed to fail the set of criteria when the query access plan is not the most cost effective plan for the particular circumstance in which it is configured to be used (e.g., particular database configuration, particular amounts and types of computing resources available, etc.). This may occur, for example, when an estimated cost of implementing the query access plan on the production database by the production system running on a particular set of computing resources exceeds an estimated cost of implementing another known query access plan (for the same query) under those same circumstances. In some embodiments, the cost of a given query access plan may refer to the amount of time that it will take to execute the query access plan under the circumstances presented.

A determination is made in operation 307 as to whether the query optimization criteria are satisfied. If not, then another production query access plan is generated (per operation 305 again) and compared to the set of query optimization criteria (per operation 306 again). If, however, a determination is made in operation 307 that the production query access plan satisfies the set of query optimization criteria, then, per operation 308, the production query access plan may be stored in a production plan cache for use in future executions of the same query. In some embodiments, operations of the method 300 may be combined. For example, operations 305-307 may be performed together in a single, larger operation wherein the query optimization criteria are used in the generation of the production query access plan, rather than waiting to apply these criteria until after it has already been generated.

Per operation 309, the production query access plan is implemented in the production database by the production system. A result set is generated and, per operation 310, is provided to the user as a response to the query.

Per operation 311, a determination may be made as to whether the backup query access plan generation and management will be handled by the production system or by a backup system, such as backup DBMS 133 of FIG. 1. In some embodiments, this determination may be made on a query-by-query basis or periodically. For example, during times of low querying activity, the production system may handle backup query access plan generation and management. Conversely, during times of high query activity, the production system may delegate this responsibility to the backup system. Further, in some embodiments, the determination may be fixed. For example, the backup query access plan generation and management may always (or almost always) be handled by only one of the production system and the backup system. Ultimately, if the backup system is to be responsible for the backup query access plan generation and management, then the method 300 may proceed to operation 401 of method 400 of FIG. 4. If, however, the responsibility falls to the production system, then the method may proceed to operation 501 of method 500 of FIG. 5.

Figure 4:
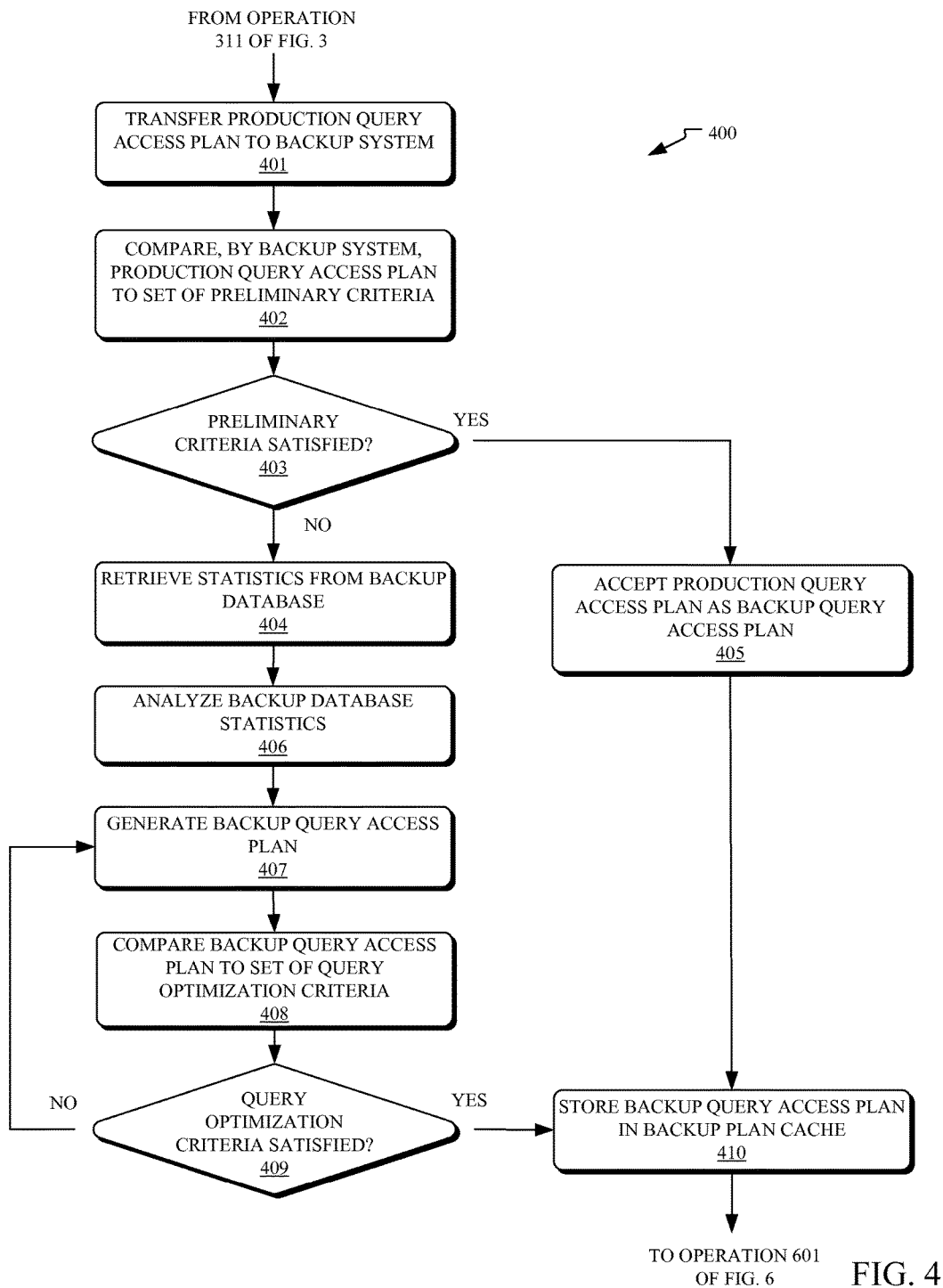
FIG. 4 illustrates a flowchart of an example method for using a backup system for backup query access plan generation and management, in accordance with embodiments of the present disclosure.

Referring now to FIG. 4, shown is a flowchart of an example method 400 for using a backup system for backup query access plan generation and management, in accordance with embodiments of the present disclosure. In some embodiments, one or more operations of method 400 may be carried out by elements of backup DBMS 133 of FIG. 1, such as preliminary evaluator 218 and optimizer 214 of FIG. 2. The method 400 may proceed from operation 311 of FIG. 3. Per operation 401, a production query access plan is transferred from a production system to the backup system. In some embodiments, this may occur each time a new query access plan is generated. In other embodiments, this may occur periodically and multiple query access plans for multiple queries may be transferred in bulk (for example, at the same time as updates are being added to the backup database or other parts of the backup system from the production system). Furthermore, in some embodiments, the backup system may determine that for certain queries, transferred query access plans are being rebuilt every time they are sent over by the production system. In such situations, the backup system may indicate to the production system not to send over any future query access plans for these particular queries. This may serve to reduce unnecessary data transfer between the production system and the backup system.

Per operation 402, the backup system compares the production query access plan to a set of preliminary criteria. In some embodiments, the purpose of this comparison is to determine whether the production query access plan will likely be acceptable for use on the backup system or whether differences between the production system and the backup system make it such that a new query access plan will likely need to be generated. As used herein, a variety of factors may be used in formulating the set of preliminary criteria. In some embodiments, a production query access plan may be deemed to satisfy the set of preliminary criteria when the production query access plan is estimated to take less than a threshold amount of time to implement on a backup database. For example, if the production query access plan is expected to take less than one second to implement using the backup system, then it may be deemed to satisfy the set of preliminary criteria (e.g., because it may not be worth the time or resources to try to improve on a query that already runs so quickly). In some embodiments, the operation 402 may be performed by an optimizer of the backup system doing a quick estimate. Further, in some embodiments, the set of preliminary criteria may be the same as the set of query optimization criteria.

Per operation 403, a determination is made, based on the comparison, as to whether the preliminary criteria are satisfied for the production query access plan. If the preliminary criteria are satisfied, then, per operation 405, the production query access plan is accepted as the backup query access plan (e.g., it is accepted for use on the backup system), and, per operation 410, the backup query access plan is stored in a plan cache of the backup system.

If, however, a determination is made in operation 403 that the production query access plan does not satisfy the set of preliminary criteria, then, per operation 404, statistics are retrieved from the backup database. Per operation 406, the backup database statistics are analyzed. Based on the analysis and per operation 407, a backup query access plan is generated by the backup system. Per operation 408, the backup query access plan is compared to the set of query optimization criteria. Per operation 409, a determination is made as to whether, with respect to the backup system, the backup query access plan satisfies the set of query optimization criteria. If not, then another backup query access plan is generated (per operation 407 again) and compared to the set of query optimization criteria (per operation 408 again). If, however, a determination is made in operation 409 that the backup query access plan satisfies the set of query optimization criteria, then, per operation 410, the backup query access plan may be stored in the plan cache for use in future executions of the query by the backup system.

In some embodiments, operations 404 and 406 may not be utilized, for example, where the statistics obtained from the production database (e.g., in operation 303 and 304 of FIG. 3) are used to generate the backup query access plan rather than using new statistics from the backup database. This may be appropriate, for example, in situations where the production database and backup database are the same or substantially similar to each other.

Figure 6:
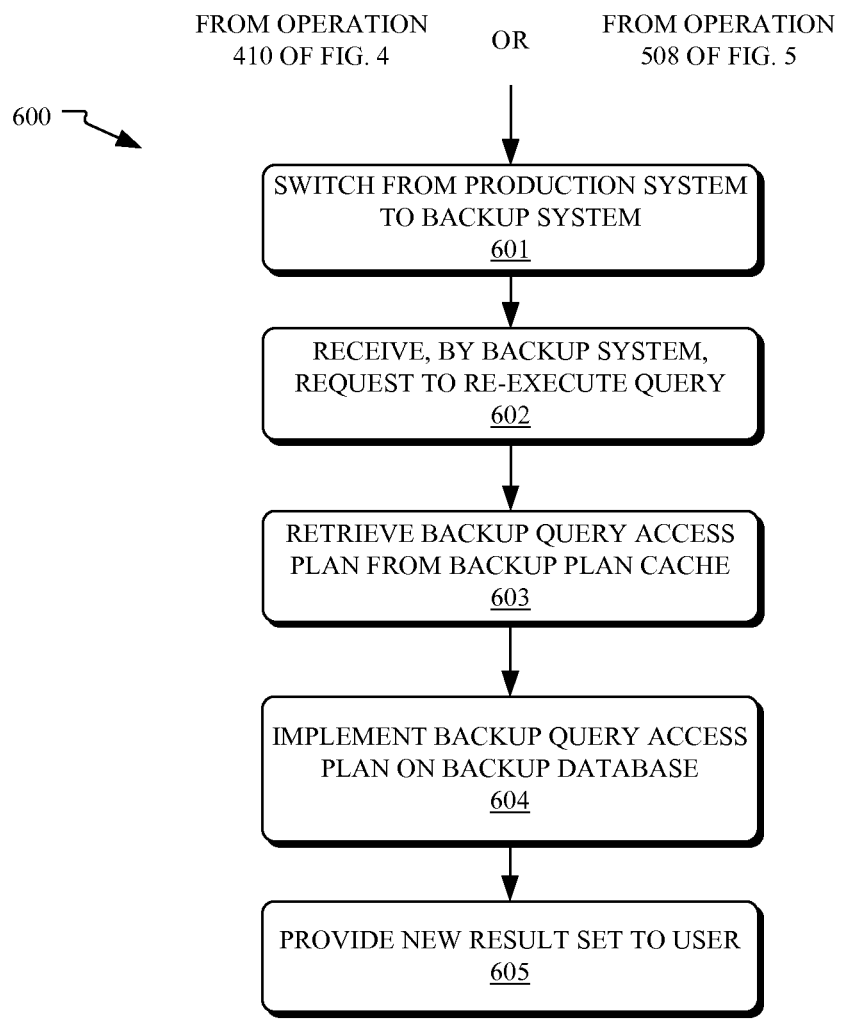
FIG. 6 illustrates a flowchart of an example method for using a backup system for providing a new result set to a user in response to a user request to re-execute a query, in accordance with embodiments of the present disclosure.

In some embodiments, upon storing the backup query access plan to the backup plan cache (in operation 410), the process may continue to operation 601 of FIG. 6.

In some variants on method 400, in some embodiments, the backup query access plan may be implemented (rather than just re-optimized) by the backup system as soon as it is generated. This implementation, which may be a test run or warmup run of sorts, may serve to build cursors and warm up the memory of the backup system with the correct tables and indexes. These cursors may then be stored in a cursor management system until there is a real request to execute the query on the backup machine. By taking these warmup steps, the backup system may be able to begin processing the query more quickly after a live switchover from the production system (if one occurs).

Figure 5:
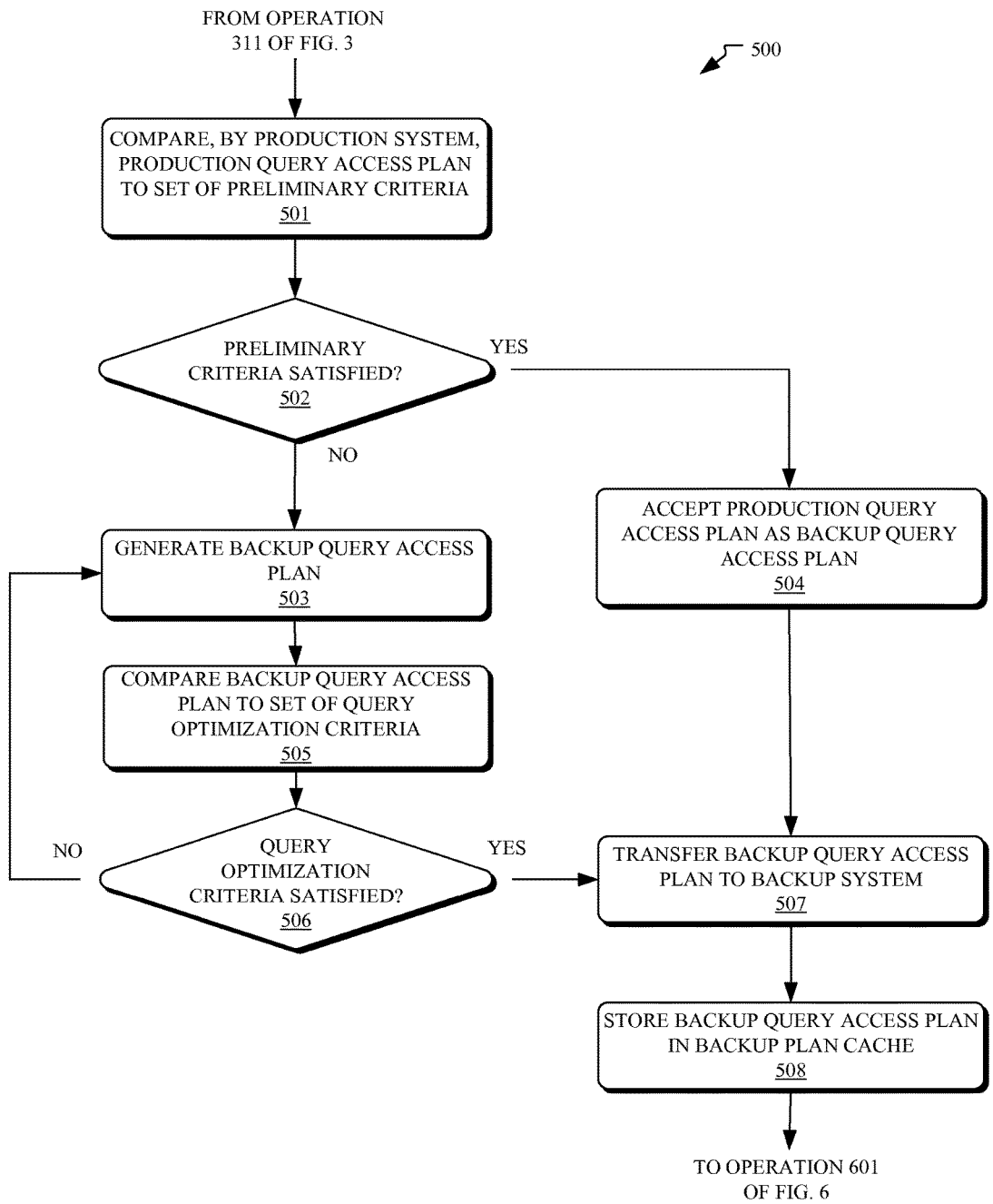
FIG. 5 illustrates a flowchart of an example method for using a production system for backup query access plan generation and management, in accordance with embodiments of the present disclosure.

Referring now to FIG. 5, shown is a flowchart of an example method 500 for using a production system for backup query access plan generation and management, in accordance with embodiments of the present disclosure. In some embodiments, one or more operations of method 500 may be carried out by elements of production DBMS 123 and of FIG. 1. The method 500 may proceed from operation 311 of FIG. 3. Per operation 501, the production system compares the production query access plan to a set of preliminary criteria. Similarly to operation 402 of FIG. 4, in some embodiments, the purpose of the comparison of operation 501 is to determine whether the production query access plan will likely be acceptable for use on the backup system.

Per operation 502, a determination is made, based on the comparison, as to whether the preliminary criteria are satisfied for the production query access plan. If the preliminary criteria are satisfied, then, per operation 504, the production query access plan is accepted as the backup query access plan (e.g., it is accepted for use on the backup system), and, per operation 507, the backup query access plan is transferred from the production system to the backup system.

If, however, a determination is made in operation 502 that the production query access plan does not satisfy the set of preliminary criteria, then, per operation 503, a backup query access plan is generated by the production system. In some embodiments, the backup query access plan may be generated using the statistics previously collected from the production database in operation 303 of FIG. 3. Per operation 505, the backup query access plan is compared to the set of query optimization criteria. Per operation 506, a determination is made, by the production system, as to whether, with respect to the backup system, the backup query access plan satisfies the set of query optimization criteria. If not, then another backup query access plan is generated (per operation 503 again) and compared to the set of query optimization criteria (per operation 505 again). If, however, a determination is made in operation 506 that the backup query access plan satisfies the set of query optimization criteria, then, per operation 507, the backup query access plan is transferred to the backup system. Per operation 508, the backup query access plan may then be stored in a plan cache on the backup system for use in future executions of the query by the backup system. In some embodiments, upon storing the backup query access plan to the backup plan cache (in operation 508), the process may continue to operation 601 of FIG. 6.

Referring now to FIG. 6, shown is a flowchart of an example method 600 for using a backup system for providing a new result set to a user in response to a user request to re-execute a query, in accordance with embodiments of the present disclosure. In some embodiments, one or more operations of method 600 may be carried out by elements of backup DBMS 133 of FIG. 1. Further, in some embodiments, the method 600 may proceed from operation 410 of FIG. 4 (e.g., when a backup query access plan for the query is generated by the backup system) or from operation 508 of FIG. 5 (e.g., when a backup query access plan for the query is generated by the production system). Per operation 601, active query processing (e.g., query executions) switches from the production system to the backup system. This may occur, for example, when the production system is undergoing maintenance or repairs. Per operation 602, the backup system receives a request from a user to re-execute a query that was previously executed on the production system. The backup system may receive the query directly from a client computer operated by the user or may receive the query via one or more intermediaries (e.g., the production system). Per operation 603, the backup system retrieves a previously generated backup query access plan from a backup plan cache. In some embodiments, the backup system may perform a quick check to confirm that the backup query access plan is (or is still) acceptable for implementation. Per operation 604, the backup query access plan is implemented on a backup database of the backup system. Per operation 605, the results of the implementation are provided as a new result set to the user.

To aid understanding, an example scenario wherein a production system and a backup system are used in accordance with some embodiments of the present disclosure is provided herein. In this scenario, the production system has twenty-four CPUs, while the backup system has only two CPUs. The production system receives, from a user, a request to execute a SQL query of "SELECT sum (s.amount) FROM mySales S WHERE S.Date Between Jan. 1, 2014 and Dec. 31, 2014." In order to execute the query, the production system is forced to process over one-third of the data records in a large table stored in a production database. Using statistics from the production database, an SQL optimizer of a DBMS running on the production system generates a production query access plan for executing the query. As generated, the production query access plan incorporates a CPU-intensive parallel table scan. The production query access plan is determined to satisfy a predetermined set of query optimization criteria. A copy of the production query access plan is stored in the production system's plan cache. To respond to the query, the production query access plan is implemented on the large table, with multiple CPUs working in parallel to process the large table. A result set is generated and is returned to the user.

An hour after returning the result set to the user, the production system does an automatic backup to the high-availability backup system. As part of the backup, queries, query access plans, tables and other update information are provided to the backup system. Upon receiving the production query access plan, the backup system performs a preliminary evaluation to determine whether the production query access plan is likely to be acceptable for use on the backup system. Because of its CPU-intensive nature, the production query access plan fails to satisfy the set of preliminary criteria. In response to the failure, an optimizer of a backup DBMS running on the backup system obtains new statistics from the backup database. The statistics are used to generate a backup query access plan for executing the query. As generated, the backup query access plan requires a less CPU-intensive index scan (rather than a parallel table scan) of the large table. The backup query access plan is determined to satisfy the set of query optimization criteria. A copy of the backup query access plan is stored to the backup plan cache of the backup system.

The next day, the production system is forced to go offline for unexpected maintenance. The query processing responsibilities are immediately switched from the production system to the backup system. Minutes after the switch, the user re-executes the query from the day before. Upon receiving the query, the backup system retrieves the backup query access plan, performs a quick check to make sure it is still acceptable, and then implements it on the backup database. The large table is processed by the backup DBMS in accordance with the backup query access plan and a new result set is returned to the user.

Figure 7:
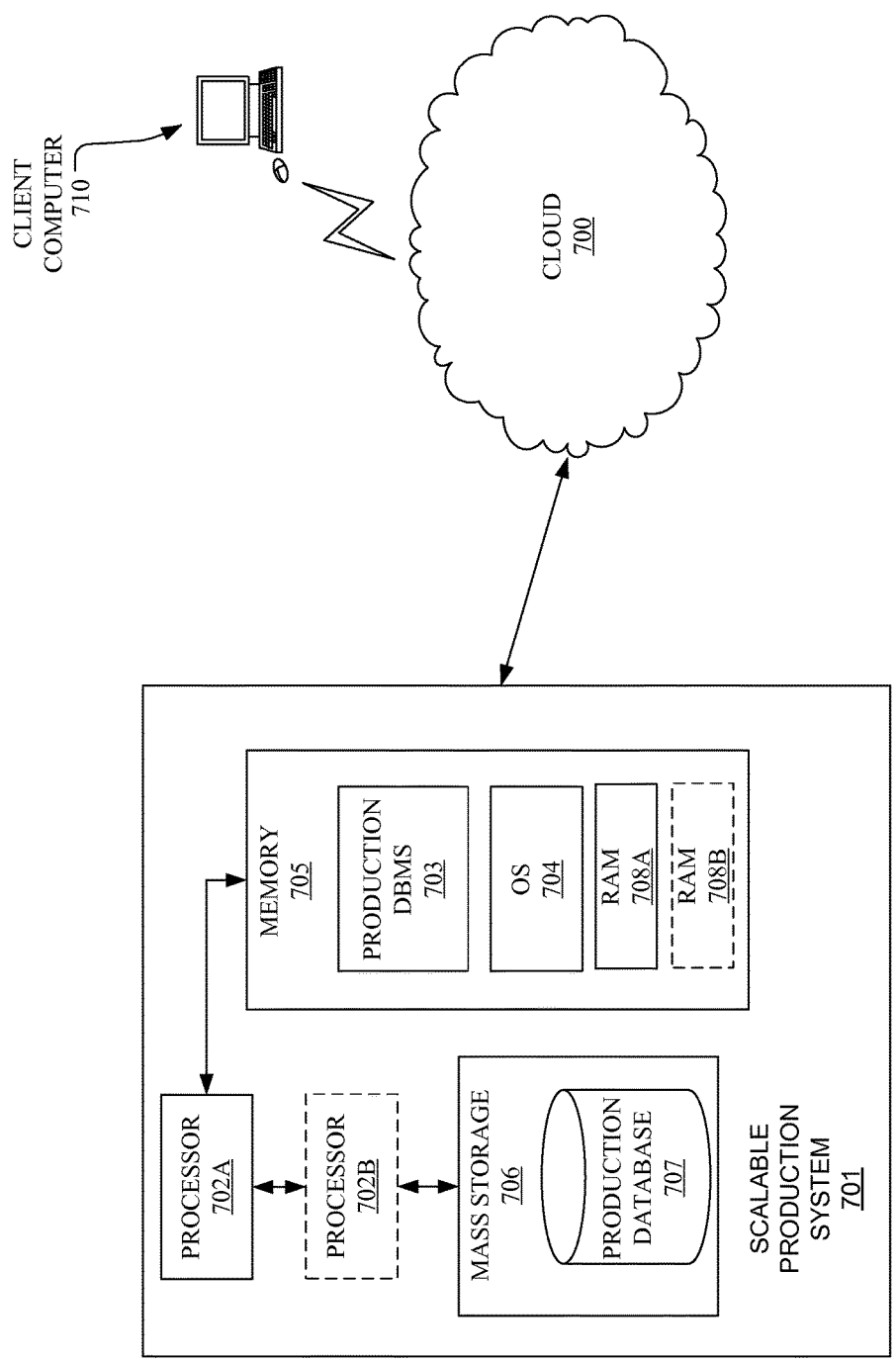
FIG. 7 illustrates a block diagram of an example cloud computing environment incorporating a scalable production system for managing a user's data, in accordance with embodiments of the present disclosure.

Referring now to FIG. 7, shown is a block diagram of an example cloud computing environment incorporating a scalable production system 701 for managing a user's data, in accordance with embodiments of the present disclosure. As shown, scalable production system 701 is hosted on a cloud 700 that is communicatively linked to a client computer 710. In some embodiments, the cloud 700 may be substantially the same as other cloud computing environments described herein.

In some embodiments, the scalable production system 701 may act as the system for the storage and management of a user's data. This system may be configured such that the computing resources on which it runs can be quickly scaled out or scaled back to meet the needs or constraints of the system. For example, during periods of high demand the set of computing resources may include more of multiple types of resources. Further, during periods of low demand the computing resources may be scaled back to preserve power or to meet other goals. As shown, the hardware and software elements of scalable production system 701 may include processors 702A, 702B in communication with mass storage 706 (which may contain production database 707) and memory 705. The memory 705 may include an OS 704, a production DBMS 703 and RAM 708A, 708B.

In some embodiments, scalable production system 701 may have access to variable sets of computing resources. For example, in one state, the production DBMS 703 may be running on processor 702A and RAM 708A, while in another state, the production DBMS 703 may be running on a second set of computing resources that includes both processors 702A and 702B and both RAM 708A and 708B.

In use, a user acting via the client computer 710 may send instructions or requests (e.g., SQL queries) to the scalable production system 701 via the cloud 700. The requests are responded to by the production DBMS 703, which runs on the OS 704. In some embodiments, the production DBMS 703 may have different operating modes that are identified based on the computing resources on which the scalable production is running. For example, during times when the scalable production system 701 is operating with a first set of computing resources, the production DBMS 703 may be deemed to be in a first operating mode. Likewise, during times when the scalable production system 701 is operating with a second set of computing resources the production DBMS 703 may be deemed to be in a second operating mode. The operating mode that the production DBMS 703 is in may have an impact on the query access plan it uses to respond to a query. For example, when the production DBMS 703 is in the first operating mode, a particular query may be responded to using a particular query access plan. In contrast, when the production DBMS 703 is in the second operating mode, that same particular query may be responded to using a different query access plan.

Figure 8:
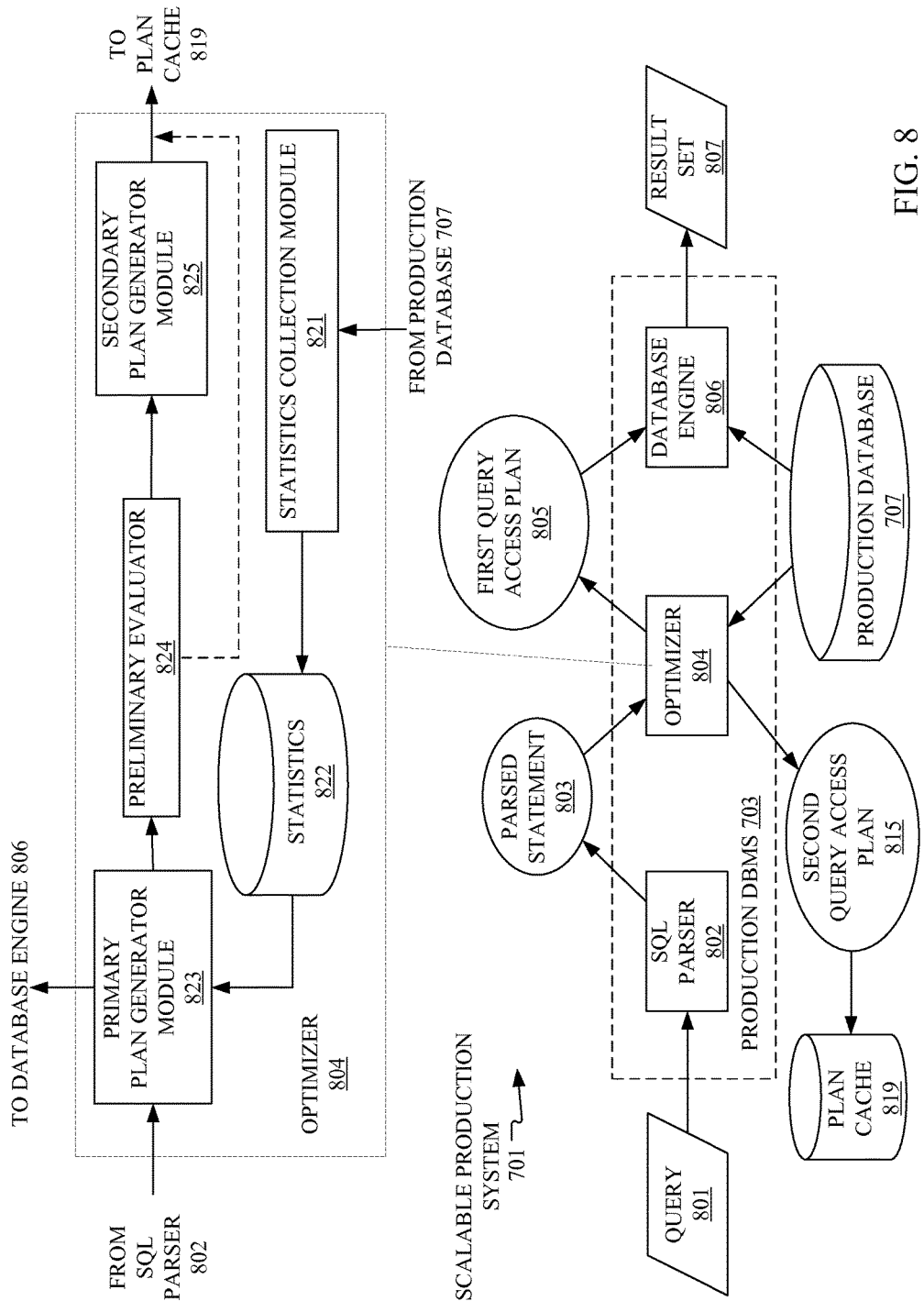
FIG. 8 illustrates a block diagram of an example use of the scalable production system shown in FIG. 7 to generate first and second query access plans for executing a query, in accordance with embodiments of the present disclosure.

Referring now to FIG. 8, shown is a block diagram of an example use of the scalable production system 701 shown in FIG. 7 to generate first and second query access plans 805, 815 for executing a query 801, in accordance with embodiments of the present disclosure. As shown, the production DBMS 703 of the scalable production system 701 may include a SQL parser 802, an optimizer 804, and a database engine 806. In this example, a query 801 generated by a user is received by the SQL parser 802 while the production DBMS is in a first operating mode (e.g., running on a first set of computing resources). SQL parser 802 then generates a parsed statement 803 therefrom, which is passed to optimizer 804 for query optimization. As a result of query optimization, two query access plans 805, 815 are generated. Specifically, a first query access plan 805 is intended to be implemented by the production DBMS 703 while in the first operating mode and a second query access 815 is intended to be implemented by the production DBMS 703 while in a second operating mode (e.g., while running on a second set of computing resources).

As shown, the optimizer 804 uses statistics 822 obtained from the production database 707 in order to create the query access plans 805, 815. More specifically, the statistics 822 are collected by a statistics collection module 821. Once collected, the statistics 822 are used, in addition to parsed statement 803, by a primary plan generator module 823 to generate the first query access plan 805. Once generated, the first query access plan 805 is forwarded to database engine 806 for execution of the query 801 on the production database 707. The result of this execution of the query 801 while the production DBMS 703 is in first operating mode is a result set 807.

In addition to being implemented (and potentially stored in a plan cache), the first query access plan 805 is also transmitted from the primary plan generator module 823 to a preliminary evaluator module 824. The preliminary evaluator then evaluates, based on a set a preliminary criteria, whether the production query access plan 805 is likely to be acceptable for use in executing the query 801 on the production DBMS 703 at a future time when the production DBMS is in the second operating mode. If the preliminary evaluator 824 determines that the first query access plan 805 is acceptable, then it is stored in the plan cache 819, without the need to generate the second query access plan 815. If the production query access plan 805 is unacceptable, then it (and/or parsed statement 803) is passed to the secondary plan generator module 825 for new query optimization based on the second set of computing resources. As a result of this new query optimization, the second query access plan 815 is generated and stored to plan cache 819 for later implementation.

Figure 9:
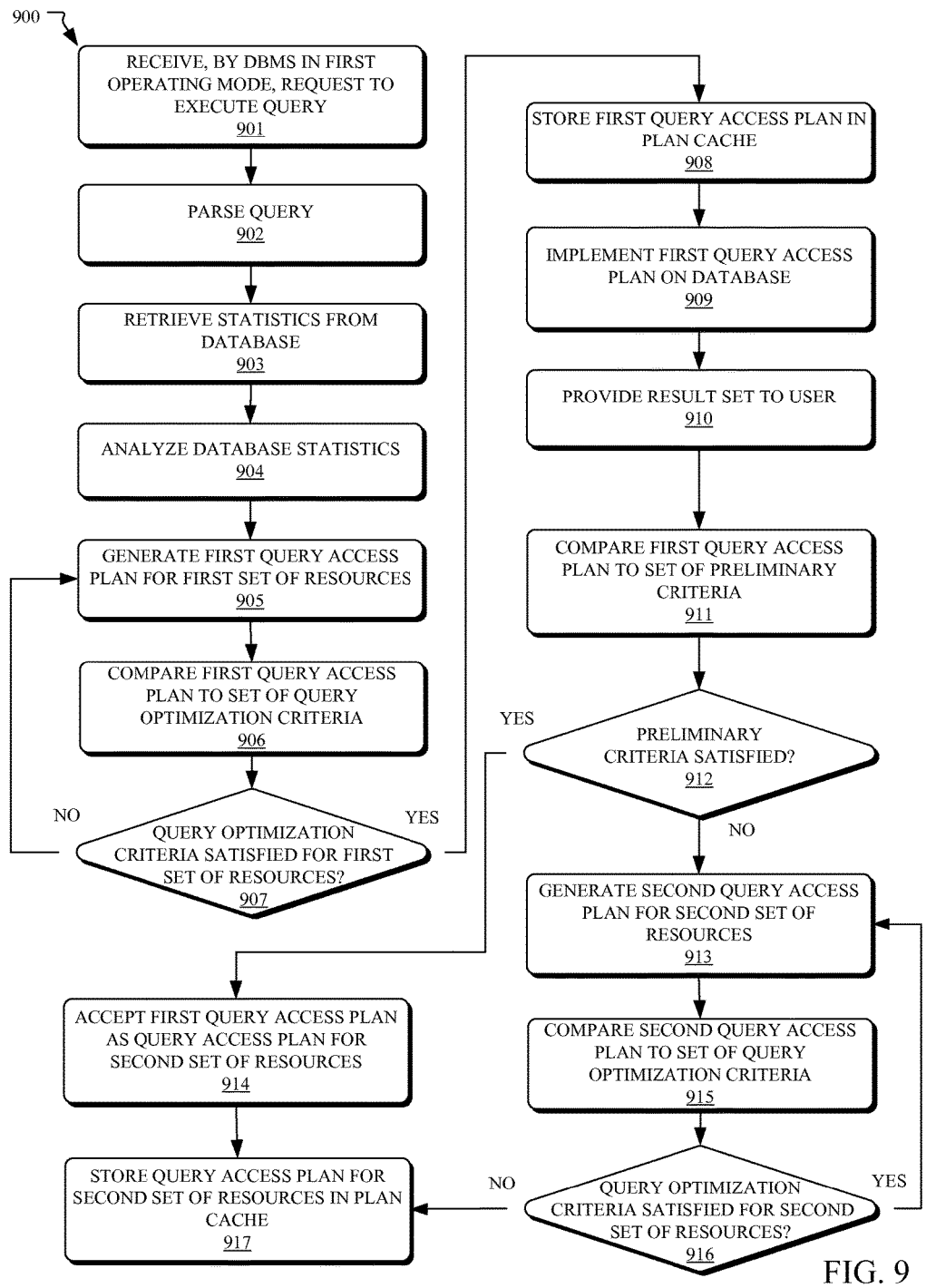
FIG. 9 illustrates a flowchart of an example method for using a scalable production system while it has access to a first set of computing resources both to provide, based on a first query access plan, a result set to a user in response to a query and also to generate a second query access plan for executing the query at a future time when the scalable production system will have access to a second set of computing resources, in accordance with embodiments of the present disclosure.

Referring now to FIG. 9, shown is a flowchart of an example method 900 for using a scalable production system while it has access to a first set of computing resources both (i) to provide, based on a first query access plan, a result set to a user in response to a query and also (ii) to generate a second query access plan for executing the query at a future time when the scalable production system will have access to a second set of computing resources, in accordance with embodiments of the present disclosure. In some embodiments, one or more operations of method 900 may be carried out by elements of production DBMS 703 of FIG. 7. The method 900 may begin at operation 901, wherein a request to execute a query is received by the production DBMS in a first operating mode (e.g., running on a first set of computing resources). In some embodiments, the entire method 900 may be performed while the production DBMS is in the first operating mode. The first set of computing resources may include, for example, processor 702A and RAM 708A and may not include, for example, processor 702B and RAM 708B of FIG. 7. Per operation 902, the query is parsed. Per operation 903, statistics are retrieved from a database (such as production database 707 of FIG. 7) and, per operation 904, the database statistics are analyzed. Based on the analysis, per operation 905, a first query access plan (e.g., a query access plan intended and/or configured to be implemented while the production DBMS is in the first operating mode) is generated for the query.

Per operation 906, the first query access plan is compared to a set of query optimization criteria. A determination is made in operation 907 as to whether the query optimization criteria are satisfied. If not, then another first query access plan is generated (per operation 905 again) and compared to the set of query optimization criteria (per operation 906 again). If, however, a determination is made in operation 907 that the first query access plan satisfies the set of query optimization criteria, then, per operation 908, the first query access plan may be stored in a plan cache for use in future executions of the same query. Per operation 909, the first query access plan is implemented in the database by the scalable production system while the production DBMS is in the first operating mode. A result set is generated and, per operation 910, is provided to the user as a response to the query.

Per operation 911, the production system compares the first query access plan to a set of preliminary criteria. In some embodiments, the purpose of the comparison of operation 911 is to determine whether the first query access plan will likely be acceptable for implementation during periods in which the production DBMS is running on a second set of computing resources (e.g., when the production DBMS is in a second operating mode). The second set of computing resources may include, for example, processor 702A and 702B and RAM 708A and 708B of FIG. 7.

Per operation 912, a determination is made, based on the comparison, as to whether the preliminary criteria are satisfied for the first query access plan. If the preliminary criteria are satisfied, then, per operation 914, the first query access plan is accepted as a second query access plan (e.g., it is accepted for use in implementations where the production DBMS is in the second operating mode), and, per operation 917, the second query access plan is stored in the plan cache.

If, however, a determination is made in operation 912 that the first query access plan does not satisfy the set of preliminary criteria, then, per operation 913, a second query access plan (e.g., a query access plan intended and/or configured to be implemented while the production database is in the second operating mode) is generated. Per operation 915, the second query access plan is compared to the set of query optimization criteria. Per operation 916, a determination is made, while running in the first operating mode, as to whether, with respect to the second set of computing resources, the second query access plan satisfies the set of query optimization criteria. If not, then another second query access plan is generated (per operation 913 again) and compared to the set of query optimization criteria (per operation 915 again). If, however, a determination is made in operation 916 that the second query access plan satisfies the set of query optimization criteria, then, per operation 917, the second query access plan is stored in the plan cache for use in appropriate future executions of the query.

To aid understanding, an example scenario wherein a scalable production system is used in accordance with some embodiments of the present disclosure is provided herein. In this scenario, the scalable production system runs on a cloud computing environment. In order to save money, the scalable production system includes a nighttime mode during which time it runs on five gigabytes of RAM, as opposed to the two terabytes of RAM on which it runs during its normal, daytime mode.

One evening, while the scalable production system is in nighttime mode it receives a request from a user to execute the query of "SELECT Sum(sales) FROM Sales Tbl a inner join Part Tbl b on a.PartID=b.PartID WHERE b.PartManufacture='Smith Co.' AND a.customer not like % John Doe, Supervisor %." In response to the request, the optimizer of a DBMS running on the scalable production system obtains statistics from a database and generates a first query access plan. As generated, the first query access plan incorporates nest loop joins because of their low memory requirements. The first query access plan satisfies a set of query optimization criteria with respect to the computing resources available during the nighttime mode. A copy of the first query access plan is stored to a plan cache. The first query access plan is then immediately used to implement the query on the database. Based on the implementation, a result set is returned to the user.

Once it has returned the result set and while it is still operating in nighttime mode, the DBMS compares the first query access plan to a set of preliminary criteria. Based on the comparison, the DBMS determines that the first query access plan is unacceptable (e.g., not optimized) for use during the daytime mode because it does not take advantage of the RAM that will be available during that time. In response to the determination, a second query access plan is generated based on the previously collected statistics. As generated, the second query access plan incorporates hash table processing (rather than the nested loop joins of the first query access plan). The second query access plan is determined to satisfy the set of query optimization criteria with respect to the computing resources available during daytime mode. The second query access plan is stored to the plan cache.

The next day, while the scalable production system is operating in the daytime mode, the user transmits a request to re-execute the query. The second query access plan is retrieved from the plan cache and is implemented on the database. Based on this new implementation, a new result set is returned to the user.

In some variants of the systems described herein, in some embodiments, scalable backup systems may be used. This may occur, for example, in situations where a backup system only runs on half of its computing resources, while the other half remains in a standby state until a switchover from a production system to the scalable backup system occurs. In some embodiments, the scalable backup system may utilize one-half of its computing resources to generate backup query access plans that are configured to be implemented using all of the backup system's computing resources. Then, when a switchover occurs, the backup system begins running on its full set of computing resources and executes the backup query access plans.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
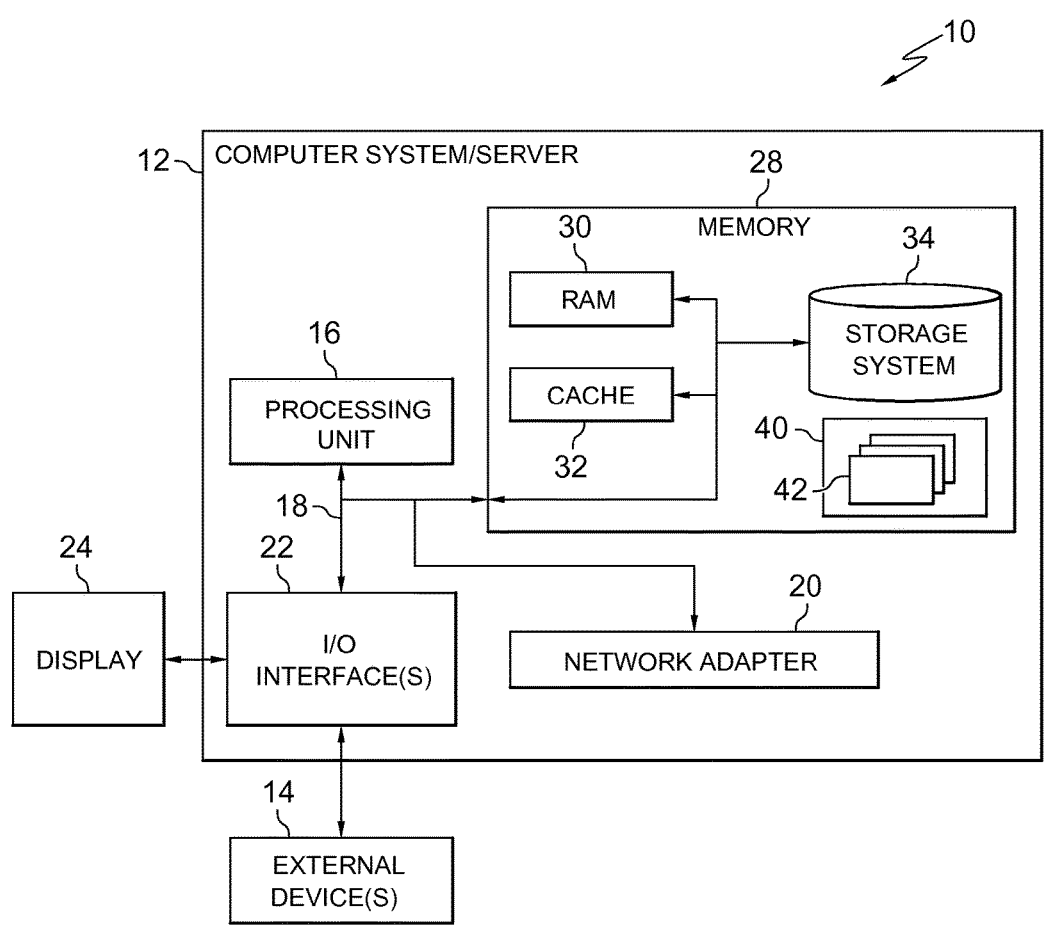
FIG. 10 illustrates a diagram of a cloud computing node, in accordance with embodiments of the present disclosure.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
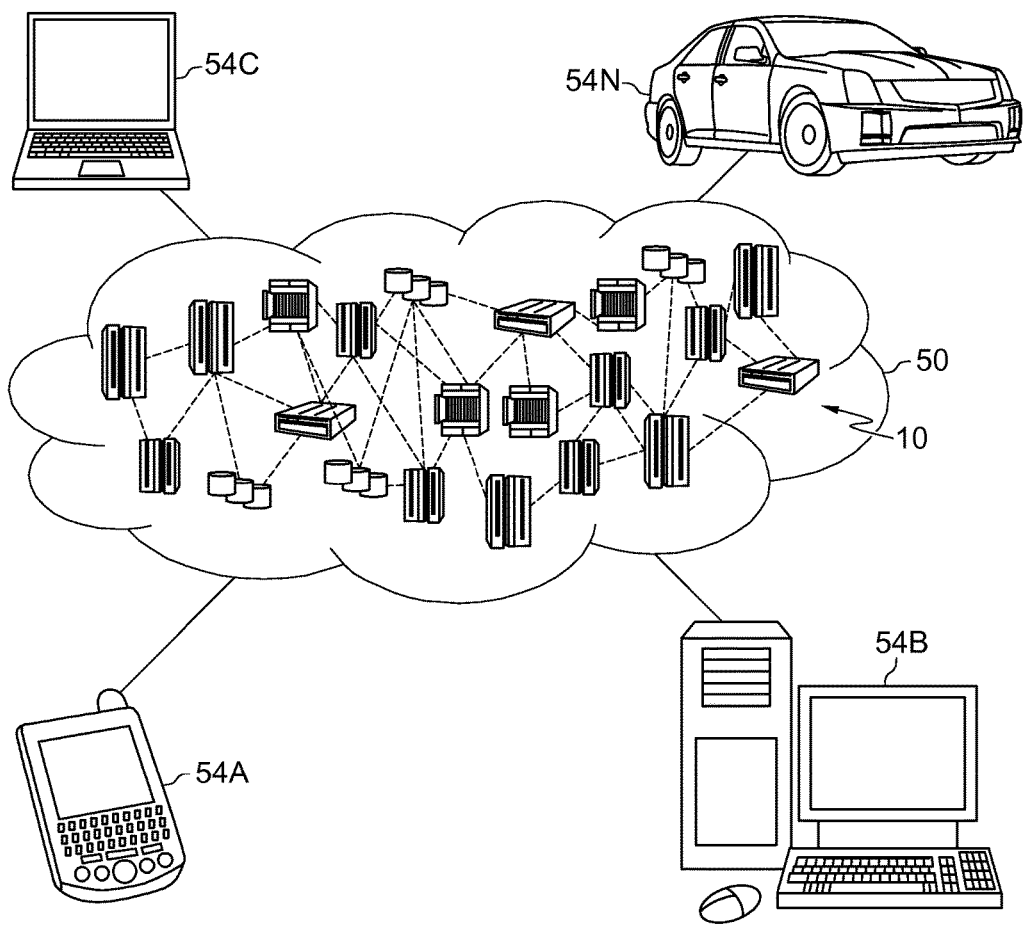
FIG. 11 illustrates a diagram of a cloud computing environment, in accordance with embodiments of the present disclosure.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
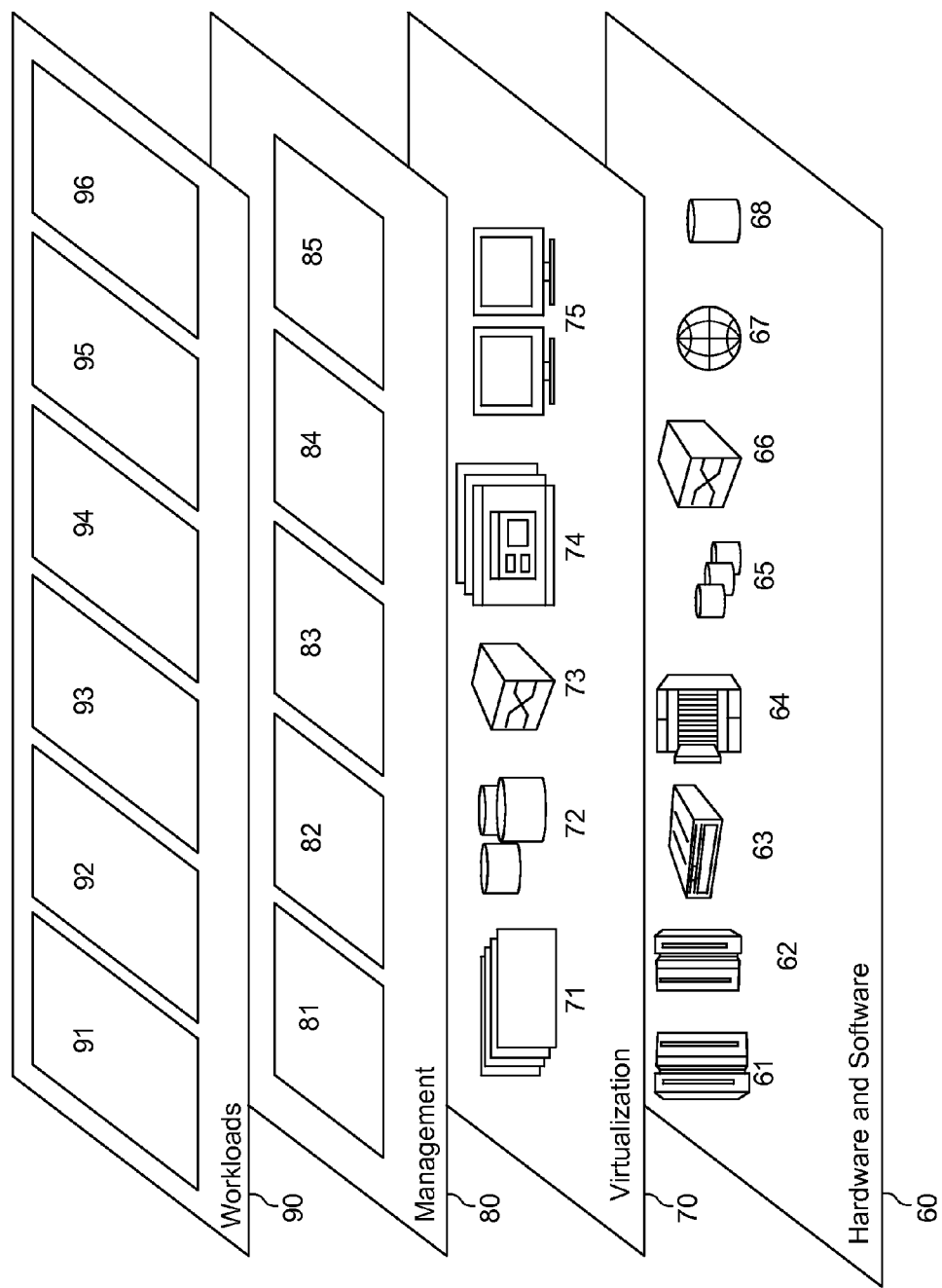
FIG. 12 illustrates a diagram of abstraction model layers, in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query optimization 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

determining, by an optimizer of a first database management system (DBMS) running on a first computer system having a first set of computing resources, that with respect to the first set of computing resources a first query access plan configured for executing a query satisfies a set of query optimization criteria;

determining, in preparation for the first computer system being unavailable for use in responding to future requests to execute the query, that with respect to a second set of computing resources of an alternative, second computer system the first query access plan fails a set of preliminary criteria;

generating, in response to the failure determination, a second query access plan configured for executing the query;

determining, prior to receiving, by a second DBMS running on the second computer system having the second set of computing resources, a first request to execute the query, that with respect to the second set of computing resources the second query access plan satisfies the set of query optimization criteria; and storing, in response the second query access plan satisfaction determination, the second query access plan such that the second query access plan can be executed by the second computer system in an event that the first computer system is unavailable to use in responding to the first request to execute the query.

2. The method of claim 1, wherein the first computer system further includes a first database, the method further comprising:
- receiving, by the first DBMS and prior to the first query access plan satisfaction determination, a second request to execute the query;
- generating, by the first DBMS and in response to the receiving the second request to execute the query, the first query access plan based on statistics for the first database; and
- obtaining, in response to the receiving the second request to execute the query, a first result set for the query by implementing, by the first DBMS, the first query access plan on the first database.

3. The method of claim 1 further comprising:
- receiving, by the second DBMS and subsequent to the storing, the first request to execute the query; and
- obtaining, in response to the receiving the first request to execute the query, a second result set for the query by implementing, by the second DBMS, the second query access plan.

4. The method of claim 1, wherein the set of preliminary criteria and the set of query optimization criteria are the same.

5. The method of claim 1, wherein the first computer system is part of a production system including a production database, wherein the second computer system is part of a backup system including a backup database, and wherein the backup database contains a backup copy of data contained within the production database.

6. The method of claim 5, wherein the production system further includes a production plan cache and wherein the backup system further includes a backup plan cache, the method further comprising:
- receiving, by the first DBMS and prior to the first query access plan satisfaction determination, a second request to execute the query;
- generating, by the first DBMS and in response to the receiving the second request to execute the query, the first query access plan based on statistics for the production database;
- storing, in response to the first query access plan satisfaction determination, the first query access plan to the production plan cache; and
- obtaining, in response to the receiving the second request to execute the query, a first result set for the query by implementing, by the first DBMS, the first query access plan on the production database, wherein the second query access is stored to the backup plan cache.

7. The method of claim 6, wherein the production system performs the generating the second query access plan, wherein the optimizer of the first DBMS performs the failure determination and the second query access plan satisfaction determination, and wherein the generating the second query access plan is based on the statistics for the production database.

8. The method of claim 6, wherein the backup system performs the generating the second query access plan, wherein an optimizer of the second DBMS performs the failure determination and the second query access plan satisfaction determination, and wherein the generating the second query access plan is based on the statistics for the backup database, the method further comprising:
- transferring, prior to the failure determination, the first query access plan from the production system to the backup system.

9. The method of claim 5, further comprising:
- switching, subsequent to the storing, from the production system to the backup system;
- receiving, subsequent to the switching and by the second DBMS, the first request to execute the query; and
- obtaining, in response to the receiving the first request to execute the query, a second result set for the query by implementing, by the second DBMS, the second query access plan.

10. The method of claim 1 wherein, prior to receiving, by the second DBMS running on the second computer system having the second set of computing resources, the first request to execute the query, the first DBMS running on the first computer system having the first set of computing resources performs the generating the second query access plan, the failure determination, and the second query access plan satisfaction determination.

11. The method of claim 10, further comprising:
- switching, subsequent to the second query access plan satisfaction plan determination, from the first computer system to the second computer system;
- receiving, subsequent to the switching and by the second DBMS, the first request to execute the query; and
- obtaining, in response to the receiving the first request to execute the query, a result set for the query by implementing, by the second DBMS, the second query access plan.

* * * * *